(12) United States Patent
Chelminski

(10) Patent No.: US 8,971,152 B2
(45) Date of Patent: Mar. 3, 2015

(54) DEVICE FOR MARINE SEISMIC EXPLORATIONS FOR DEPOSITS

(71) Applicant: Stephen Chelminski, Antrim, NH (US)

(72) Inventor: Stephen Chelminski, Antrim, NH (US)

( * ) Notice: Subject to any disclaimer, the term of this patent is extended or adjusted under 35 U.S.C. 154(b) by 0 days.

(21) Appl. No.: 14/187,309

(22) Filed: Feb. 23, 2014

(65) Prior Publication Data

US 2014/0238772 A1    Aug. 28, 2014

Related U.S. Application Data

(60) Provisional application No. 61/768,496, filed on Feb. 24, 2013, provisional application No. 61/791,342, filed on Mar. 15, 2013.

(51) Int. Cl.
*G01V 1/38* (2006.01)
*G01V 1/137* (2006.01)

(52) U.S. Cl.
CPC . *G01V 1/137* (2013.01); *G01V 1/38* (2013.01)
USPC .......................................... 367/144; 181/120

(58) Field of Classification Search
USPC ........................................................ 367/144
See application file for complete search history.

(56) References Cited

U.S. PATENT DOCUMENTS

| | | |
|---|---|---|
| 3,249,177 A | 5/1966 | Chelminski |
| 3,310,128 A | 3/1967 | Chelminski |
| 3,376,723 A | 4/1968 | Chelminski |
| 3,379,273 A | 4/1968 | Chelminski |
| 3,506,085 A | 4/1970 | Loper |
| 3,548,630 A | 12/1970 | Chelminski |
| 3,613,824 A | 10/1971 | Loper |
| 3,653,460 A | 4/1972 | Chelminski |
| 3,707,848 A | 1/1973 | Chelminski |
| 3,793,844 A | 2/1974 | Chelminski |
| 3,808,822 A | 5/1974 | Chelminski |
| 3,808,823 A | 5/1974 | Chelminski |
| 3,997,021 A | 12/1976 | Chelminski |
| 4,038,630 A | 7/1977 | Chelminski |
| 4,240,518 A * | 12/1980 | Chelminski .................. 181/107 |
| 4,271,924 A | 6/1981 | Chelminski |
| 4,472,794 A * | 9/1984 | Chelminski .................. 367/144 |
| 4,597,464 A * | 7/1986 | Chelminski .................. 181/114 |
| 4,599,712 A | 7/1986 | Chelminski |
| 4,608,675 A * | 8/1986 | Chelminski .................. 367/189 |
| 4,712,202 A * | 12/1987 | Chelminski .................. 367/144 |
| 4,712,641 A * | 12/1987 | Chelminski .................. 181/113 |
| 4,723,230 A * | 2/1988 | Chelminski .................... 367/20 |
| 4,739,859 A * | 4/1988 | Delano ........................ 181/119 |
| 4,754,443 A | 6/1988 | Chelminski |
| 4,757,482 A | 7/1988 | Fiske, Jr. |
| 4,779,245 A | 10/1988 | Chelminski |
| 4,798,261 A * | 1/1989 | Chelminski .................. 181/120 |
| 4,858,718 A * | 8/1989 | Chelminski .................. 181/106 |
| 4,939,704 A * | 7/1990 | Chelminski .................. 367/146 |
| 5,315,917 A | 5/1994 | Mayzes |

(Continued)

*Primary Examiner* — Luke Ratcliffe
*Assistant Examiner* — James Hulka
(74) *Attorney, Agent, or Firm* — Z IP Law PLLC; Claire Zopf

(57) ABSTRACT

An air gun for use in generating seismic energy impulses operable at pressures below 1000 psi that reduces high frequencies and cavitation around the discharge of the air gun in order to mitigate damage to the marine environment, the air gun providing a sliding seal at the firing piston, an extension of port widths beyond the diameter of the firing piston and capability to control the speed of the shuttle assembly to reduce and eliminate some of the possible causes of the objectionable high frequencies and cavitation.

15 Claims, 14 Drawing Sheets

(56) References Cited

U.S. PATENT DOCUMENTS

| | | |
|---|---|---|
| 5,432,757 A | 7/1995 | Chelminski |
| 5,615,170 A * | 3/1997 | Chelminski ................. 367/15 |
| 5,978,316 A * | 11/1999 | Ambs et al. ................. 367/134 |
| 6,464,035 B1 * | 10/2002 | Chelminski ................. 181/120 |
| 6,612,396 B1 * | 9/2003 | Chelminski et al. ......... 181/113 |
| 7,269,099 B2 | 9/2007 | Jensen |
| 8,223,591 B2 | 7/2012 | Chelminski |
| 2006/0021609 A1 * | 2/2006 | Jensen ......................... 124/56 |
| 2008/0019214 A1 * | 1/2008 | Pramik ......................... 367/16 |
| 2010/0320027 A1 * | 12/2010 | Chelminski ................. 181/120 |

* cited by examiner

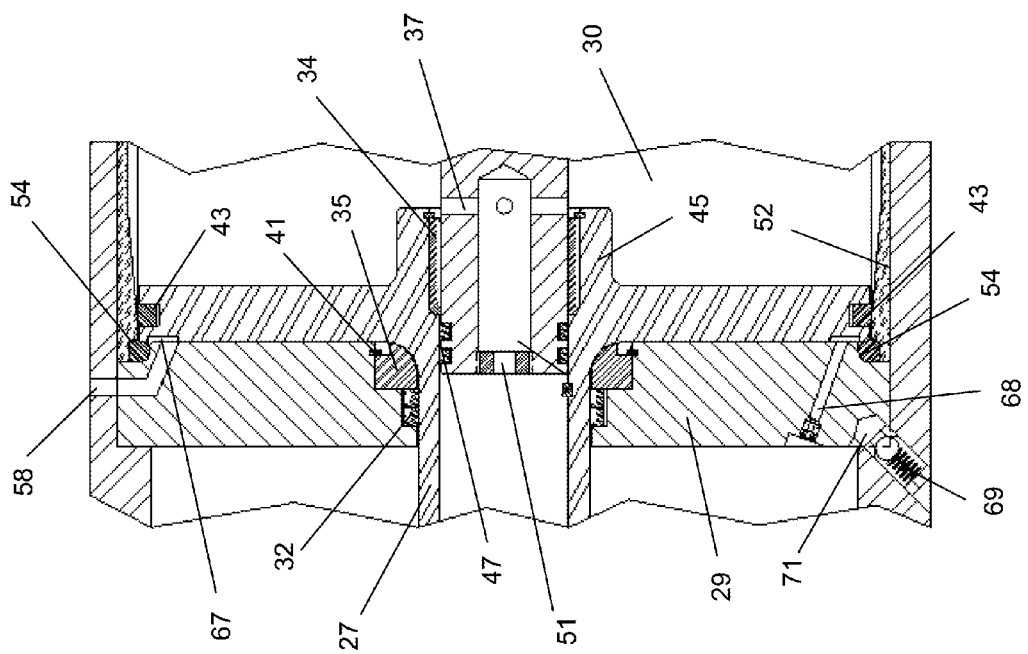

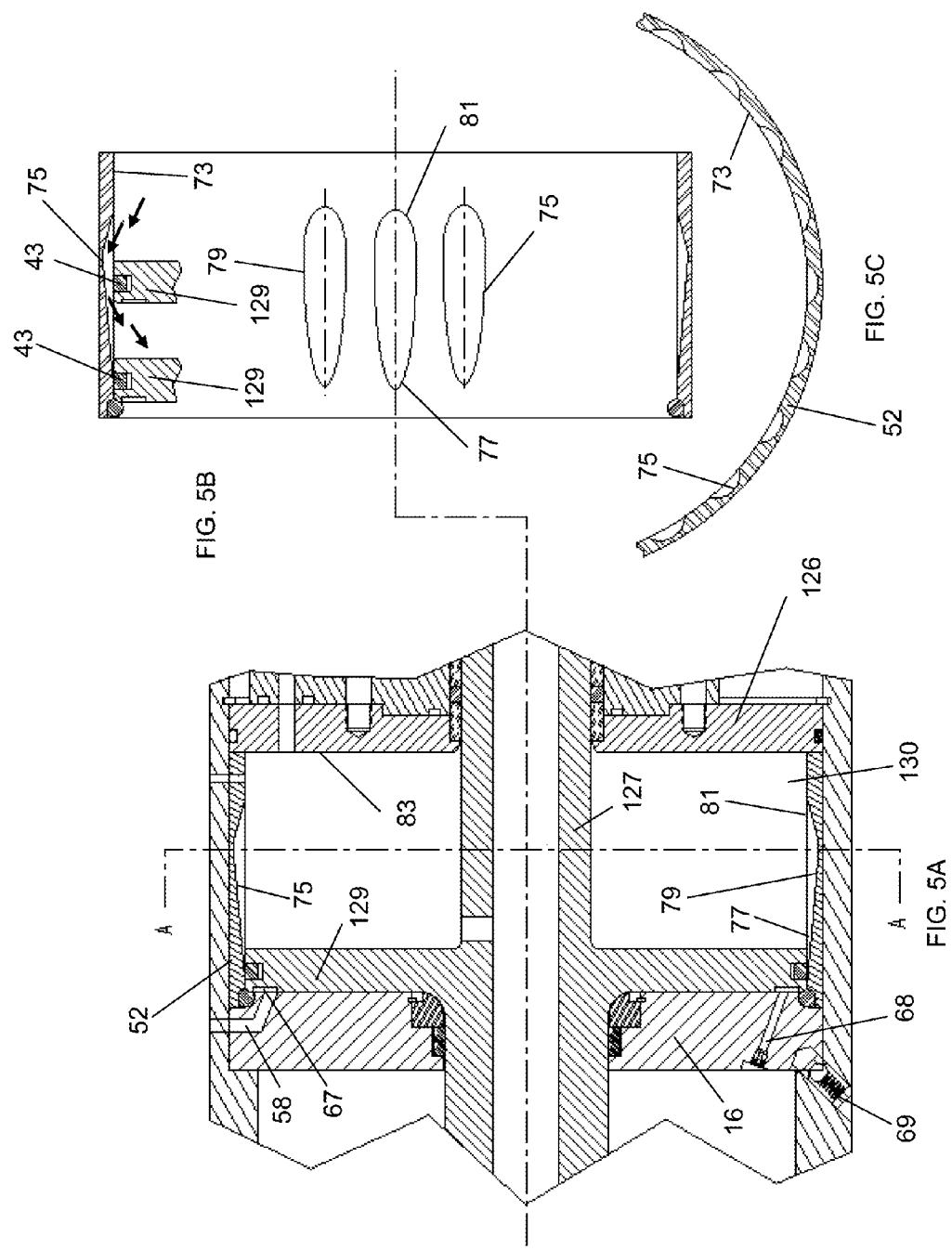

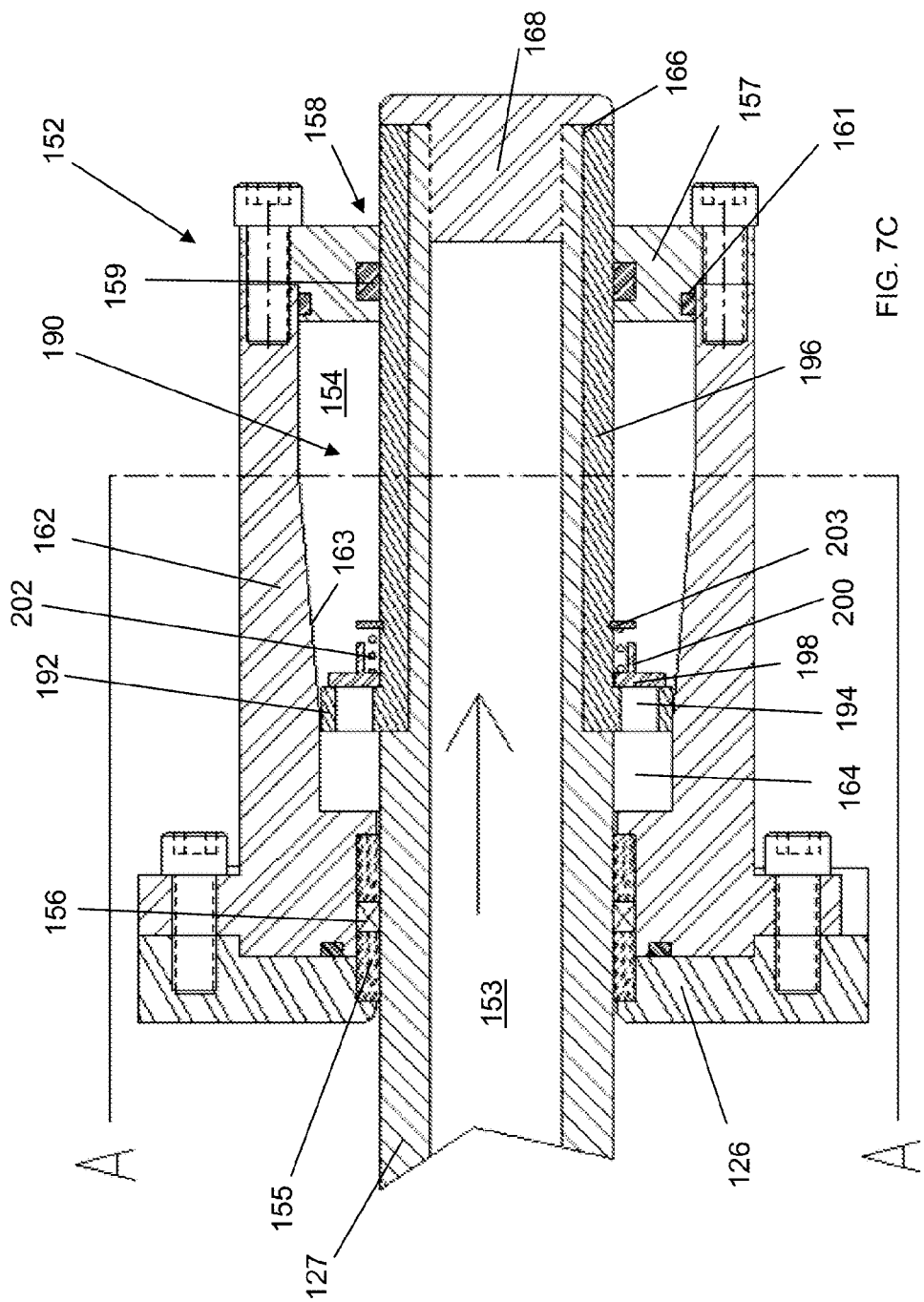

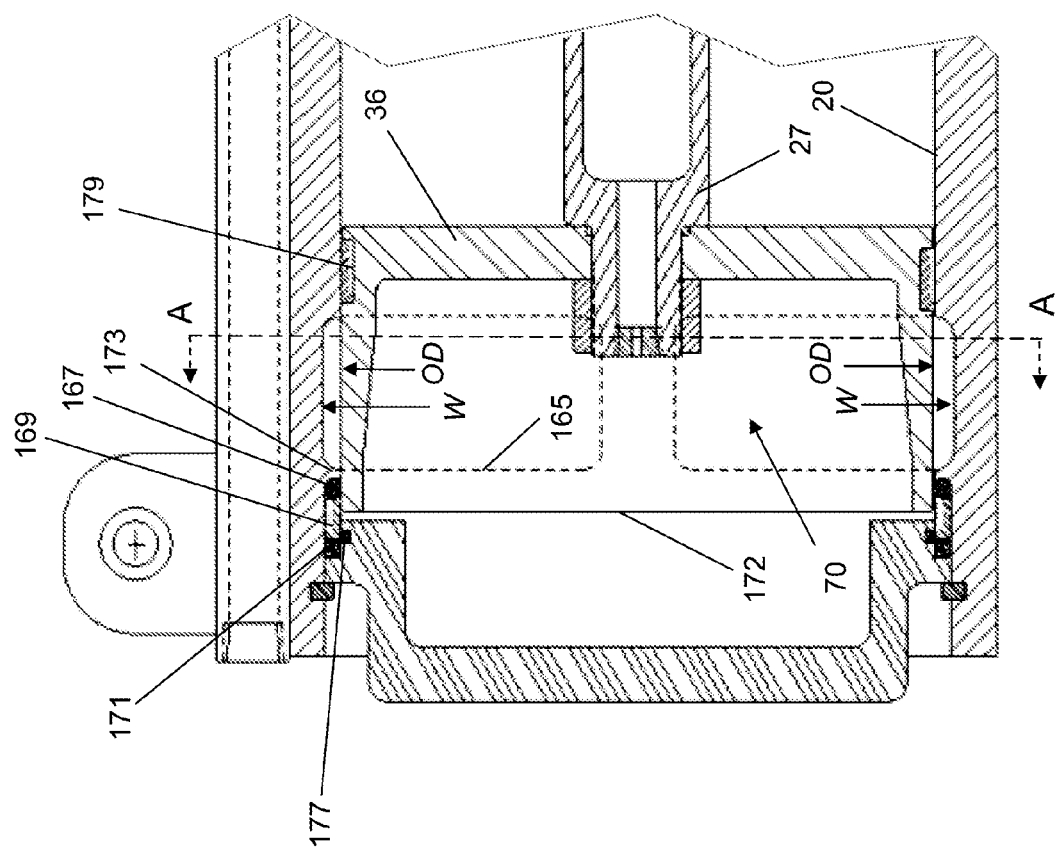

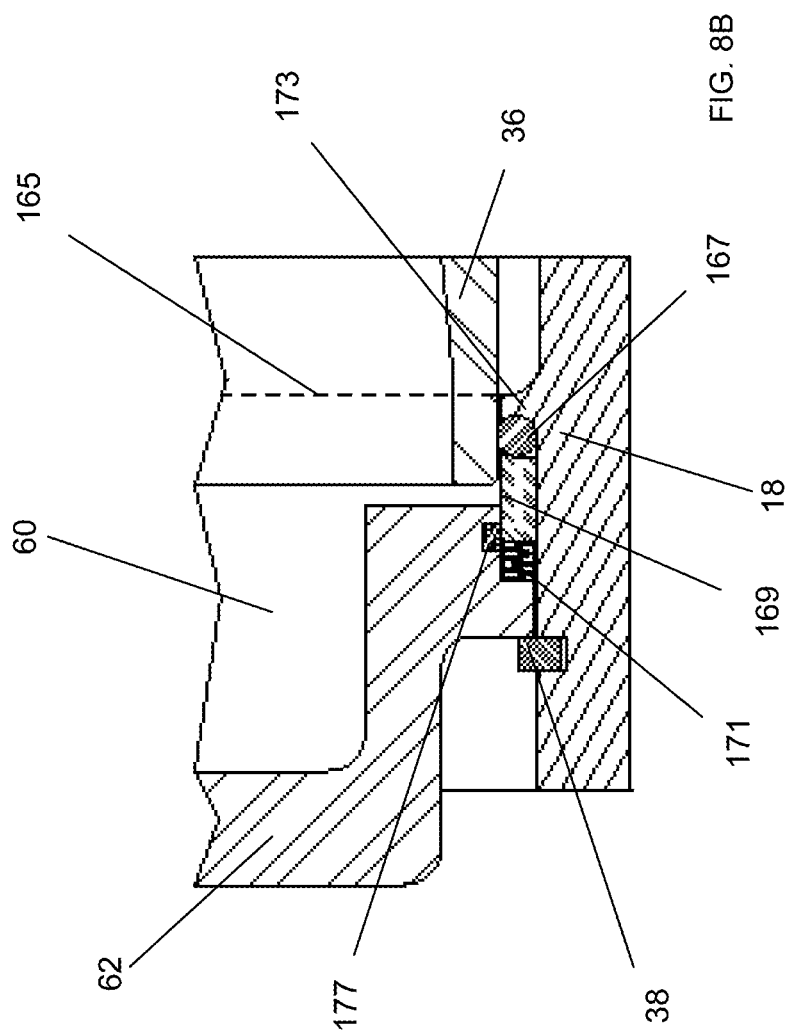

DEVICE FOR MARINE SEISMIC EXPLORATIONS FOR DEPOSITS

RELATED PATENT APPLICATIONS

This application claims the benefit of pending U.S. Provisional Patent Application No. 61/768,496 filed Feb. 24, 2013 and U.S. Provisional Patent Application No. 61/791,342 filed Mar. 15, 2013 both applications entitled DEVICE FOR MARINE SEISMIC EXPLORATIONS FOR DEPOSITS which are each hereby incorporated herein by reference in the entirety.

FIELD OF THE INVENTION

The present invention relates to air guns intended for use in generating seismic energy impulses, i.e. acoustical waves, in a body of water. More particularly, this invention relates to low pressure air guns operable at pressures below 1000 psi in order to mitigate damage to the marine environment by reducing or eliminating high frequency sounds which are thought to be the source of damage to the hearing of marine mammals and fish as well as disturbing the habitats and well-being of marine life.

BACKGROUND OF THE INVENTION

Air guns, as used herein, are sound sources for marine seismic exploration for petroleum deposits. The operating components of air guns of the prior art include a firing chamber holding a charge of gas under high pressure, a two-piston shuttle assembly having a firing piston which retains the charge of pressurized gas within the firing chamber, and an operating piston positioned within an operating chamber where highly pressurized gas acts against the operating piston to maintain the shuttle assembly in a closed position until firing. A hollow shaft of the shuttle assembly interconnects the two pistons and provides for pressurized gas to flow from the operating chamber through the shaft to charge the firing chamber. The air gun is triggered using a solenoid operated valve to release high pressure air into the operating chamber actuating the shuttle assembly to cause an abrupt discharge of high pressure air from the firing chamber through discharge ports and directly into the surrounding water, the water in which the air gun is immersed.

Air guns of the prior art are normally run using an air compressor on board an exploration vessel that yields high pressure compressed air in the range of 2000 psi to 3000 psi. The air gun is towed astern. The return signals are received by an array of towed hydrophones. Air guns are relatively deep penetration sources, operating with output frequencies generally between 10 Hz to about 1200 Hz, to identify subsurface geologic layers and define the subsurface structure. The present invention provides many advantages considered significant and valuable by the inventor hereof. The inventor hereof has additional patents such as U.S. Pat. Nos. 3,379,273 4,038,630, 4,271,924, 4,599,712, 4,779,245, 5,432,757, and 8,223,591. There are also some other inventors in the same field such as Fiske, U.S. Pat. No. 4,757,482, Mayzes, U.S. Pat. No. 5,315,917, Jensen U.S. Pat. No. 7,269,099 and others in the field.

OBJECTS AND SUMMARY OF THE INVENTION

As noted, air guns of the prior art that are used for oil exploration typically use air pressures of from 2000 psi to 3000 psi which explodes from the air guns when they are triggered thus producing the sound pulses used for seismic analysis. The high operating pressures of these air guns produce spurious high frequency sounds which are not helpful for the purpose of finding oil and which are thought to be the source of damage to the hearing of marine mammals and fish as well as disturbing the habitats and well-being of marine life. There is recently mounting pressure on the exploration industry to eliminate these high frequencies from the pulses of the air gun arrays used. Possible causes of these high frequencies being, 1) the high pressure which air guns are run at cause cavitation at the corners of the ports as the air bursts out of the ports; 2) high pressure air leaking from clearances between the gun housing and shuttle as the shuttle accelerates after being triggered before clearing the ports; 3) conventional air guns shoot a slug of water out of the ports as the shuttle accelerates after the gun is triggered this slug of water may be producing a water gun effect causing cavitation as water guns do when they are triggered; and 4) the high pressure air may rush out of the ports at such high velocity as to cause high frequency sounds due to cavitation around the edges of the ports during its acceleration from the ports. The high pressures as well produce a very short rise time of the initial pulse that is thought to also be a cause of unwanted high frequencies. The air gun of the present invention reduces high frequencies and cavitations by providing a sliding seal at the firing piston, extending the discharge port widths beyond the diameter of the firing piston and controlling the speed of the shuttle assembly to control the rate of release of pressurized air through the outlet ports. By controlling the rate of release of the pressurized air, the rise time from zero pressure to peak pressure of the first or primary pressure pulse may be slowed, increasing the time to reach peak pressure which may in fact reduce some of the causes the objectionable high frequencies and cavitation. Additionally, providing an air gun which fires at low pressure will itself be a source of reduced high frequency noise.

It is an object of the present invention to operate an air gun at low pressures below 1000 psi and more preferably at pressures from 400 psi-600 psi.

It is another object of the invention to provide an air gun which produces little or no harmful high frequencies.

It is another object of the invention to provide an air gun which produces increased low frequency output.

It is another object of the invention to provide an air gun which reduces cavitation around the air gun to limit the disruption of the marine ecosystem.

It is another object of the invention to provide a sound source which will produce more low frequency energy and less high frequencies.

It is another object of the present invention to assemble an air gun lighter in construction in proportion to the lower operating pressure of a low pressure air gun as compared to the operating pressure of a conventional high pressure air gun thereby producing a lighter and more easily handled air gun.

It is another object of the present invention to assemble a low pressure air gun using a snap ring to affix the firing chamber to the cylindrical housing of the low pressure air gun housing.

It is another object of the present invention to assemble a low pressure air gun using a snap ring to affix the operating chamber head to the cylindrical housing of the low pressure air gun housing.

It is another object of the present invention to reduce the use of bolts or clamp rings in assembling the air gun by using snap rings.

It is another object of the present invention to assemble a low pressure air gun having shuttle assembly flanges that are thinner and lighter than conventional high pressure air guns providing for faster acceleration of the shuttle assembly within the air gun housing.

It is another object of the present invention to assemble a low pressure air gun having a sliding firing seal that is directly adjacent to the ports to prevent the release of air from the firing chamber until the firing piston moves past the ports.

It is another object of the present invention to prevent air leakage during the acceleration distance.

It is another object of the present invention to extend the width of the ports beyond the outer diameter of the firing piston providing a larger communication area of air expelled to the outside water for the least amount of travel of the shuttle assembly.

It is another object of the present invention to improve the firing precision of the air gun by providing a shortened trigger air passage, the air passage at a length shorter than the radius of the operating flange.

It is another object of the invention to provide an air cushion chamber of a length that is approximately 20% longer in length than the length of the operating chamber thereby reducing pressure buildup in the air cushion chamber that may decrease the length of the stroke of the shuttle assembly.

It is another object of the invention to provide full opening of the ports at low pressure.

It is another object of the invention that from a set position the distance from the inner face of the firing piston is longer than the distance from the face of the operating flange to the chamber head.

It is another object of the invention to assemble an air gun having a piston ring on the outside diameter of the shuttle assembly operating flange.

It is another object of the invention to control the speed of the shuttle assembly through adjustment of the geometry of grooves by adjusting the depth, width, length, and slope of grooves within a fluted sleeve within the operating chamber.

It is another object of the present invention to provide an air gun with improved shuttle assembly speed control.

It is another object of the present invention to control the rise time from zero pressure to peak pressure of the first or primary pressure pulse to increase the time to reach peak pressure to reduce or eliminate objectionable high frequencies.

It is another object of the present invention to assemble a low pressure air gun using vacuum oven brazing at mating surfaces to affix a reinforcing backbone to the cylindrical housing, the back bone having air passages for providing compressed air to the low pressure air gun.

It is another object of the present invention to assemble a low pressure air gun using vacuum oven brazing to affix a bulkhead wall within the cylindrical housing of the air gun.

It is another object of the present invention to reduce degradation and wear on seals and structural components of the low pressure air gun.

It is a still further object of the invention to provide an air gun which by virtue of being operated at low pressures is safer.

The present invention is related to an air gun for seismic exploration, that comprises a cylindrical housing having a plurality of discharge ports; a bulkhead wall within the cylindrical housing to separate an operating chamber from an air cushion chamber; a shuttle assembly having a shaft inserted through a central opening in the bulkhead wall and having an operating flange on an end of the shaft within the operating chamber; a cup shaped firing piston secured to an opposing end of the shuttle assembly shaft, the firing piston separating the air cushion chamber from the firing chamber; and wherein the air cushion chamber is of a length along the shuttle axis that is at least 1.2 times the length of the operating chamber along the shuttle axis.

The air gun for seismic exploration operates at pressures below 1000 psi and more preferably within a range of 400 psi to 600 psi. The bulkhead wall of the air gun for seismic exploration may be vacuum brazed within the cylindrical housing. The central opening in the bulkhead wall of the air gun may have shaft seal rings and a retainer ring. The shuttle assembly shaft has a hollow bore through the shaft and cylindrical bearings and piston rings within the hollow bore and a shuttle assembly support spindle is inserted within the hollow bore. The air gun for seismic exploration further comprises snap rings to attach the firing chamber and an operating chamber head to the cylindrical housing. The air gun for seismic exploration further comprises a backbone vacuum brazed permanently in place on top of and to reinforce the cylindrical housing and serve as a flat mounting surface for solenoid operated air gun firing valve. The air gun for seismic exploration further comprises a trigger air passage directly through the backbone and the bulkhead wall to an annular space of the operating flange within the operating chamber. The air gun may comprise a solenoid valve housing detachable from the reinforcing backbone, the solenoid valve housing enclosing one of at least a solenoid operated air gun firing valve and a firing circuit. Alternatively, the air gun may comprise a solenoid valve housing vacuum brazed to the reinforcing backbone. The cup shaped firing piston of the air gun may have a sliding seal preventing air leaks between the cylindrical housing, firing chamber and air cushion chamber until the air gun is triggered and air is released through the plurality of discharge ports. The plurality of discharge ports of the air gun may have at least one horizontal post divider and the ports may extend beyond the outer diameter of the cup shaped firing piston, and the ports may point outwardly opposite each other and horizontally away from the center line of the air gun.

The present invention further relates to a low pressure air gun for seismic exploration which reduces spurious high frequency sounds, that comprises a cylindrical housing; a bulkhead wall within the cylindrical housing to separate an operating chamber from an air cushion chamber; a central opening in the bulkhead wall; a shuttle assembly having a shaft inserted through the central opening in the bulkhead wall and having an operating flange on an end of the shaft within the operating chamber; a cup shaped firing piston secured to an opposing end of the shuttle assembly shaft separating the air cushion chamber from the firing chamber; a plurality of ports formed within the cylindrical housing, the width of the ports extending to a distance greater than the outer diameter of the cup shaped firing piston; a firing chamber secured to the cylindrical housing; and the air gun operates at pressures is in a range of 400 psi to 1000 psi.

The air cushion chamber of the low pressure air gun for seismic exploration which reduces spurious high frequency sounds may be of a length along the shuttle axis that is at least 1.2 times the length within the operating chamber along the shuttle axis as measured from the face of the operating flange to an operating chamber head. The low pressure air gun for seismic exploration which reduces spurious high frequency sounds may further comprise a speed controller which comprises a fluted sleeve installed within the operating chamber; a piston ring installed to the outer diameter of the operating flange; and when triggered the operating flange moves the piston ring over the fluted sleeve to control the speed of the shuttle assembly. The speed controller controls the speed of the shuttle assembly to control the rise time from zero pressure to peak pressure of the primary pressure pulse. The speed controller fluted sleeve has grooves and the slope of the rise time of the primary pressure pulse is adjusted by modifying the geometry of one of at least the length, width, depth, slope and shape of the grooves. The low pressure air gun may further comprise a fluid filled speed controller.

The low pressure air gun for seismic exploration which reduces spurious high frequency sounds further comprises snap rings to attach the firing chamber and the operating chamber head to the cylindrical housing. The low pressure air gun for seismic exploration which reduces spurious high frequency sounds further comprises a backbone vacuum brazed permanently in place on top of and to reinforce the cylindrical housing and serve as a flat mounting surface for solenoid operated air gun firing valve. The low pressure air gun further comprises a trigger air passage directly through the backbone and the bulkhead wall to an annular space of the operating flange within the operating chamber said trigger air passage length less than radius of the operating flange. The low pressure air gun may further comprise a solenoid valve housing detachable from the reinforcing backbone, the solenoid valve housing enclosing one of at least a solenoid operated air gun firing valve and a firing circuit. Alternatively, the low pressure air gun may further comprise a solenoid valve housing vacuum brazed to the reinforcing backbone. The bulkhead wall of the low pressure air gun may be brazed in place to the cylindrical housing. The low pressure air gun may further comprise shaft seal rings and a retainer ring installed within the central opening in the bulkhead wall around the shuttle assembly shaft to seal the operating chamber from the air cushion chamber. The cup shaped firing piston of the low pressure air gun may have a sliding seal preventing air leaks between the cylindrical housing, firing chamber and air cushion chamber until the air gun is triggered and air is released through the plurality of ports. The plurality of ports of the low pressure air gun may have at least one horizontal post divider and the ports may extend beyond the outer diameter of the cup shaped firing piston, said ports pointing outwardly opposite each other and horizontally away from the center line of the air gun.

The present invention is further related to a method of reducing spurious high frequency sounds from an air gun, comprising the steps of assembling an air gun having a cylindrical housing; vacuum brazing a bulkhead wall within the cylindrical housing to separate an operating chamber from an air cushion chamber; installing close fitting shaft seal rings and a retainer ring within a central opening in the bulkhead wall; inserting a shuttle assembly having a shaft through the central opening in the bulkhead wall to seal the operating chamber from the air cushion chamber, the shuttle assembly shaft having a hollow bore through the shaft and having an operating flange on an end of the shaft within the operating chamber; inserting a fluted sleeve within the operating chamber; installing a piston ring to the outer diameter of the operating flange; installing cylindrical bearings and shaft seal rings within the hollow bore of the shuttle assembly shaft; inserting a shuttle assembly support spindle within the hollow bore; affixing an operating chamber head to the cylindrical housing snap rings; affixing a cup shaped firing piston to an opposing end of the shuttle assembly shaft within the air cushion chamber; forming a plurality of ports within the cylindrical housing, the width of the ports extending to a distance greater than the outer diameter of the cup shaped firing piston; affixing a firing chamber to the cylindrical housing snap rings; supplying an air trigger pulse to the operating flange to move the piston ring over the fluted sleeve to control the speed of the operating flange and thereby the rise time from zero pressure to peak pressure of the primary pressure pulse as air is expelling from the ports as the bottom end of the cup shaped firing piston crosses an edge of the plurality of ports. The method of reducing spurious high frequency sounds from an air gun may further comprise the steps of vacuum brazing a reinforcing backbone to the cylindrical housing; and vacuum brazing a solenoid valve housing to the reinforcing backbone, the solenoid valve housing enclosing a solenoid operated air gun firing valve and firing circuit. The method of reducing spurious high frequency sounds from an air gun may further comprise the step of sealing the bottom end of the cup shaped firing piston to the firing chamber using a spring loaded backup ring and sliding firing seal. The method of reducing spurious high frequency sounds from an air gun may further comprise the step of operating the air gun at pressures below 1000 psi and more preferably within a range of 400 psi to 600 psi.

These and other features, advantages and improvements according to this invention will be better understood by reference to the following detailed description and accompanying drawings. While references may be made to upper, lower, vertical and horizontal, these terms are used merely to describe the relationship of components and not to limit the operation of the present invention to any one orientation.

BRIEF DESCRIPTION OF THE DRAWINGS

The invention, together with further objects, features, aspects and advantages thereof will be more fully understood and appreciated by consideration of the following description in conjunction with the accompanying drawings in which the respective elements bear the same reference numerals throughout the various views.

FIG. 4B is a longitudinal cross sectional view of an embodiment of the operating chamber of the air gun of the present invention;

FIG. 5A is a longitudinal cross sectional view of an embodiment of the liner sleeve of the operating chamber of the air gun of the present invention;

FIG. 5B is a longitudinal cross sectional view of an embodiment of the liner sleeve of the operating chamber of the air gun of the present invention;

FIG. 5C is a cross sectional view along section A-A of FIG. 5A of an embodiment of the liner sleeve of the operating chamber of the air gun of the present invention;

FIG. 7C is a longitudinal cross sectional view of an embodiment of a fluid filled speed controller in the firing position in the further embodiment of the air gun of the present invention;

FIG. 8A is a longitudinal cross sectional view of an embodiment of the firing chamber and discharge ports of the air gun of the present invention;

FIG. 8B is a cut out cross sectional view of an embodiment of the sliding firing seal and assembly of the air gun of the present invention.

DETAILED DESCRIPTION OF THE DRAWINGS

Figure 1:
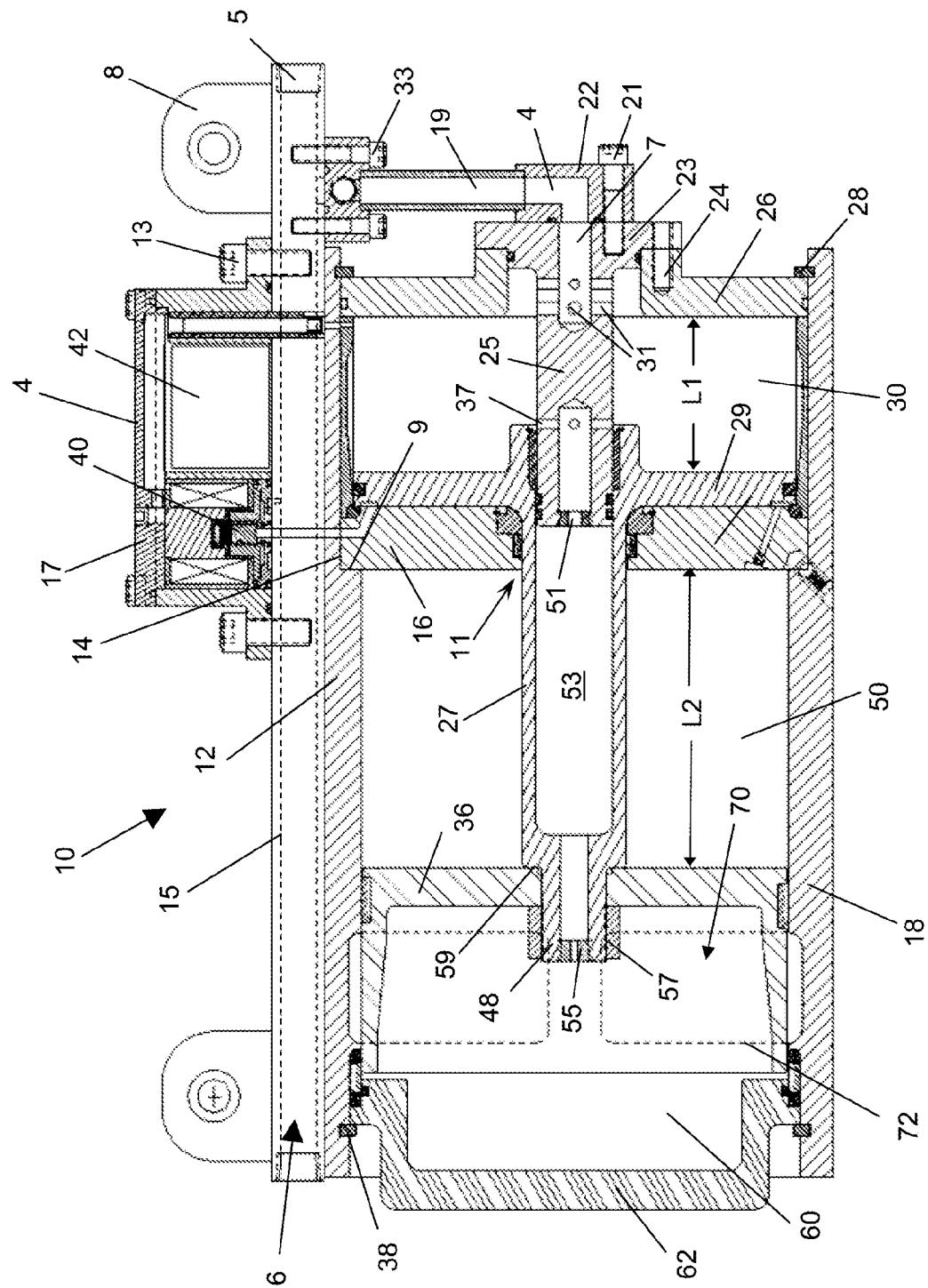
FIG. 1 is a longitudinal cross sectional view of an embodiment of the air gun of the present invention.

In an embodiment of the present invention, an air gun 10, as shown in FIG. 1, comprises a dual purpose reinforcing backbone air passage manifold 15 to strengthen the housing 18 to supply and distribute compressed air through one or more passages 6 by connecting a supply line to a connector 5 on either end of the backbone 15. The backbone 15 may have one or more tow ears 8 that may be brazed into the backbone 15 for towing the air gun 10. The backbone 15 is secured to the air gun housing 18 by vacuum oven brazing at mating surfaces 12 between the bottom of the backbone and the air gun cylindrical housing providing a flattened top for mounting a solenoid operated air gun firing valve eliminating the necessity of using bolts to attach the backbone manifold 15 to the housing 18, thus making the air gun more reliable and lighter. Bulkhead wall 16 is also brazed into air gun housing 18 at joint 14 instead of the housing being machined out of a single billet of stainless steel thus saving material costs, machine time, and labor. The bulkhead wall 16 may be seated against a shoulder 9 formed in the housing 18 where the diameter of the housing 18 is enlarged to secure the bulkhead wall 16 and form the tubular structure of the operating chamber 30. Because the air gun 10 is run at low pressures the housing 18 may have a dimensioned wall thickness that is thinner than high pressure air guns of the prior art, reducing the overall weight and costs of the air gun 10. The shuttle assembly includes a shuttle assembly shaft 27 and an operating flange 29. The shuttle assembly shaft 27 is inserted through the opening to the operating chamber 30 and through a center hole 11 in the bulkhead wall 16 with the sealing face of the operating flange 29 aligning against the bulkhead wall 16. Instead of using bolts or clamping rings, the operating chamber 30 is enclosed by securing in place the operating chamber head 26 using a retaining ring 28. The shuttle assembly support spindle 25 is inserted into the hollow shuttle assembly shaft with and the shuttle assembly support spindle flange 23 is secured to the operating chamber head 26 using bolt circle 24. An air channel block 22 is secured to the shuttle assembly support spindle flange 23 using bolt circle 21. The air channel block 22 has a 90° passage 4 to direct air flow through the air input fitting 19 and through the spindle air passage 7 to inlet openings 31 to provide air to the operating chamber 30. The compressed air input fitting 19 is secured to the backbone 15 using air input line retainer bolts 33 to communicate with compressed air passage 6.

The shuttle assembly shaft 27 extends through the bulkhead wall 16 to the air cushion chamber 50. The shaft 27 may be hollow to reduce the overall weight of the air gun 10 and act as an air supply passage for the air volume 60 within the firing chamber 62. An air inlet orifice 51 controls the flow rate of air entering the shaft interior bore 53 and an outlet orifice 55 controls the rate of flow of air entering the volume 60 of the firing chamber 62. Air is supplied from the operating chamber 30 through inlet holes 37 in the shuttle assembly support spindle 25. The shaft end 48 of the shuttle assembly shaft 27 is threaded and the cup shaped firing piston 36 is attached to the shaft end 48 using a nut 57 to lock the cup flange 36 against a shoulder 59 formed at the base of the shaft 27. Rider bearings 179 installed along the outer diameter of the cup shaped firing piston 36 to provide for the piston to freely slide along the inner walls 20 of the low pressure air gun cylindrical housing 18. In high pressure air guns of the prior art, the space behind the firing piston is filled with water that is displaced as the gun fires may cause cavitation that could disrupt the marine ecosystem. By trapping ambient air behind the firing piston, the displacement of water is reduced limiting a source of cavitation around the water gun. A series of ports 70 are formed through the housing 18 at the firing chamber 62 as indicated by dotted lines 72 showing the openings. The firing chamber 62 may be of any required dimension and may be replaced to adjust the size to create a larger or smaller volume based on survey requirements. The firing chamber 62 is secured to the air gun housing 18 using retainer ring 38. By using snap type retainer rings instead of bolts, the cylindrical walls of the housing 18 may be thinner where there is no necessity to thicken the wall to install bolts or clamping rings.

Figure 2:
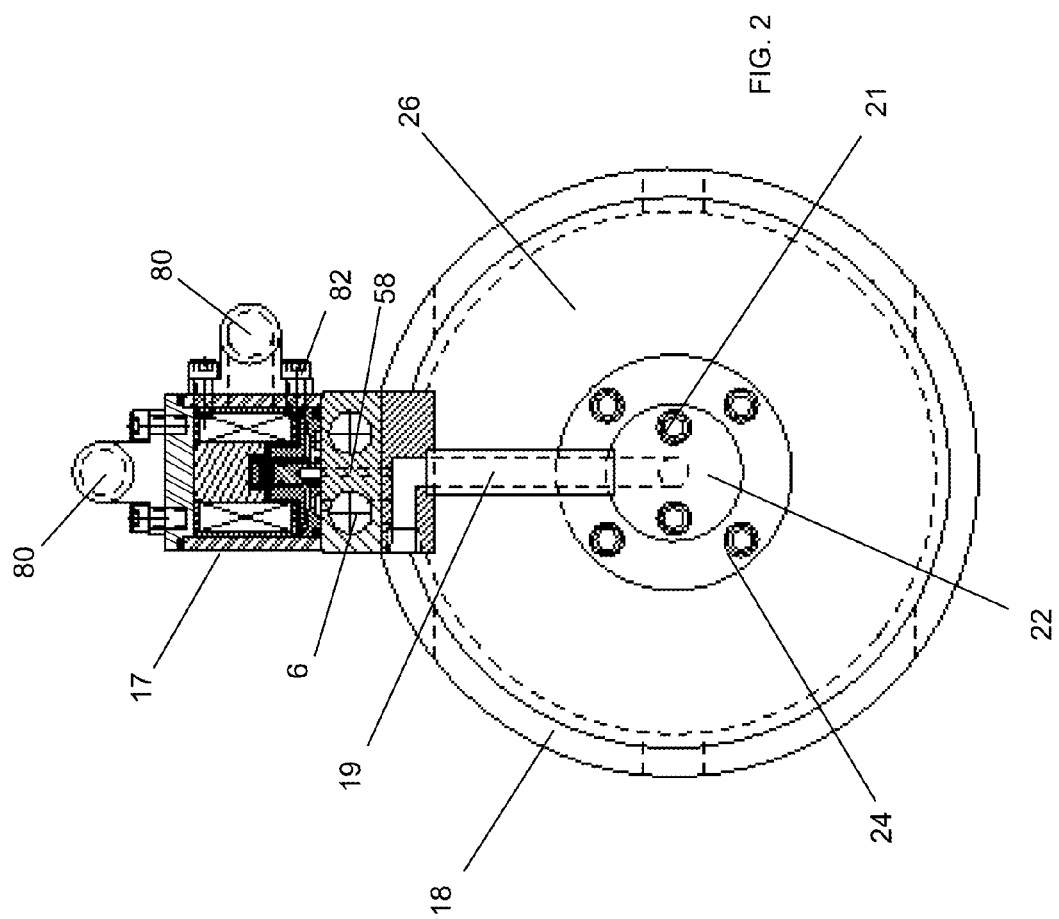
FIG. 2 is an end view of an embodiment of the air gun of the present invention showing an electrical cable block connector that may be optionally on the top or side of the solenoid valve housing of the present invention.

A solenoid valve housing 17 may be bolted using bolts 13 or be brazed to the backbone 15. The solenoid valve housing 17 may enclose only a solenoid valve 40 or a solenoid valve and control circuit 42 based on the specification requirements of the air gun system. An electrical cable block connector 80 extends either from the top or side of the solenoid valve housing 17, as shown in FIG. 2. A multi-pin cable connector (not shown) provides for the cable block connector 80 to be electrically connected to the solenoid valve 40 or control circuit 42 components. The block connector 80 may then be bolted to the solenoid valve housing 17 using bolts 82. The cable block connector 80 may be detached to replace the entire solenoid valve housing 17 with the solenoid valve 40 and control circuit 42 as a unit. Alternatively, an access cover 4 attached to the solenoid valve housing 17 using bolts 3 may be provided to provide access to repair or replace the solenoid valve housing 17 internal components. In this manner a defective control circuit or solenoid valve can be repaired or replaced without removal of the solenoid valve housing from the backbone 15. The cable block connector 80 further provides for a faulty air gun 10 to be replaced by only disconnecting the electrical cable block connector 80 from the solenoid valve housing and the air supply line from the backbone 15 and attaching the cable block connector 80 and air supply line to a new air gun 10, greatly reducing down time for failures during deployment of an array of air guns. As shown the trigger air passage 58 extends between the air passages 6 directly through the backbone 15 to provide for more precise firing of the air gun 10 where the air trigger passage is of a substantially shortened length as compared to air guns of the prior art.

Figure 3:
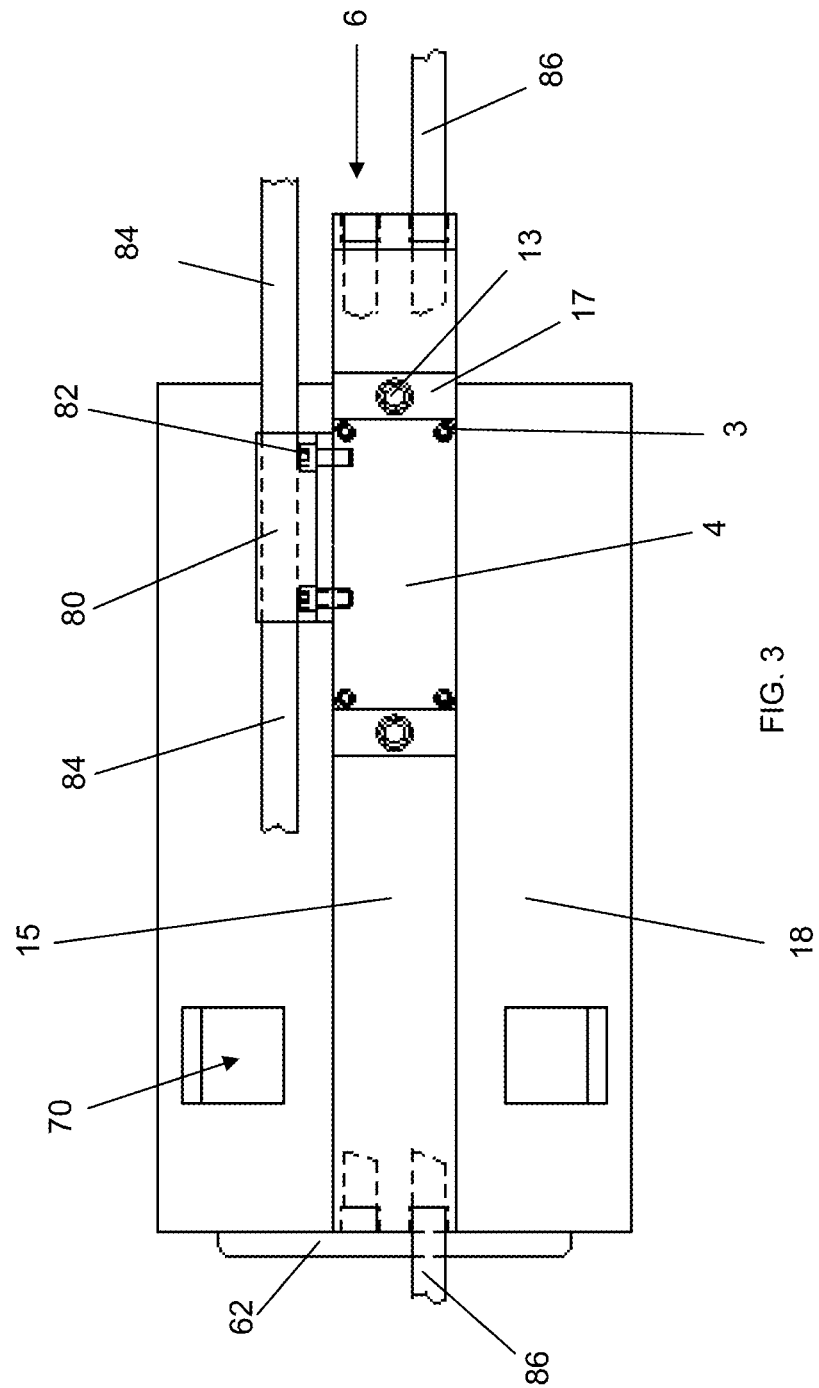
FIG. 3 is a top view of an embodiment of the air gun of the present invention.
Figure 4A:
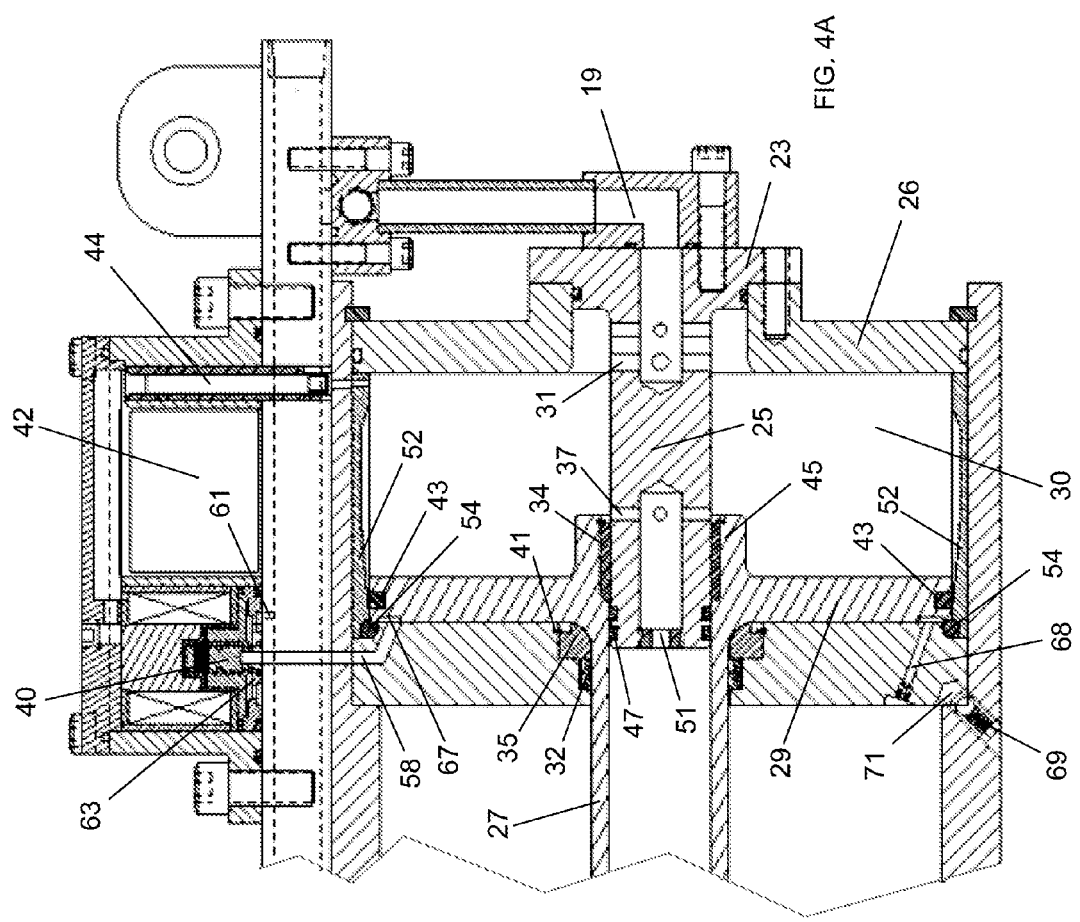
FIG. 4A is a longitudinal cross sectional view of an embodiment of the solenoid valve housing and operating chamber of the air gun of the present invention.

A top view of the air gun 10 is shown in FIG. 3 with the electric cable block connector 80 directed off to the side of the solenoid valve housing 17 and electrical cables 84 extending from the block connector 80 to the exploration vessel or other similar air guns. Air supply lines 86 extend from each end of the backbone 15. A second air passage 6 may be provided for additional air supply lines if a number of air guns 10 are used in a single array. The trigger air passage 58 directs air flow to a grooved annular space 67 around the inner face of the operating flange 29 as shown in FIG. 4A.

The present invention does not require holes to be drilled through the bulkhead wall 16 to allow water to flow to lubricate the shaft seals because the shuttle assembly shaft 27 is sealed using two close fitting self-lubricating shaft seal rings 32, as shown in FIG. 4B, that seal the operating chamber 30 from the air cushion chamber 50 and allow the shuttle shaft 27 to move freely through the center hole 11 of the bulkhead wall 16 without leakage. A retainer ring 35 holds the shaft seal rings 32 in place with the retainer ring 35 being held in place using a snap ring 41. A sliding sleeve bearing 34 is installed within a recess 45 where the shuttle assembly shaft 27 is installed along the shuttle assembly support spindle 25 with two piston rings 47 sealing the shaft 27 from the operating chamber 30. A piston ring 43 surrounds the operating flange 29 to travel along a liner sleeve 52 which retains the operating seal 54.

A trigger valve air supply hole 61 is drilled through the top wall of air passage 6 into the trigger valve air input chamber 63, enabling solenoid operated trigger valve 65 to be supplied with air. When the trigger valve 65 is actuated by an electric pulse from the firing circuit 42, a shot of air flows rapidly through trigger air passage 58 into annular space 67 to trigger the air gun by breaking the seal between the outside diameter of operating flange 29 and operating seal 54 allowing the shuttle assembly to start its firing movement as pushed by the air pressure within the firing chamber 62 across the cross sectional area of the cup shaped firing piston 30. Air vent passage 68 is drilled through bulkhead wall 16 near the bottom of operating chamber 58 and air cushion chamber 50, thus allowing the air pressure in the annular space 67 to be at ambient water pressure when the operating flange 29 has returned to the set position. Check valve 69 positioned for outward flow, vents water or air from ambient air cushion chamber 50 through drilled port 71. If any water seeps into the ambient air cushion chamber 50 between air gun shots, the air is purged out through check valve 69 by the temporary air pressure build up in ambient air cushion chamber 50 during the time the cup shaped firing piston 36 is moving from the set position as shown in FIGS. 1, 4A and 4B, to the right and back again, compressing the air from about ambient water pressure and allowing some of the air to flow through drilled passage 68 into ambient air cushion chamber 50 thus pressurizing the chamber 50 and pushing any water which may have collected in the bottom of the air cushion chamber 50 out through check valve 69 and between the clearance of the cup shaped firing piston rider bearing 179 and the cylindrical wall 20 of the housing 18. Recessed within the bulkhead wall 16, close fitting shaft seal rings 32 and retainer ring 35 prevent air from the operating chamber 30 from leaking through the center hole 11 of the bulkhead wall 16 and the outside diameter of shuttle assembly shaft 27 when the operating flange 29 is not in the set or cocked position.

When the air gun 10 is triggered, the liner sleeve 52 within the operating chamber 30, as shown in FIG. 5A, controls the air flow around the operating flange 29 to control the speed of the operating flange 29 as described in patent, U.S. Pat. No. 4,779,245 to the same inventor. However, different from the described conical tapered surface of revolution that would extend completely along the inner surface 73 of the liner sleeve 52, the present invention includes a series of non-contiguous flutes or grooves 75 shown in FIGS. 5B and 5C as cross sections of the operating chamber 30 along section A-A shown in FIG. 5A. The grooves 75 are machined into the sleeve 52 and are formed as a shallow narrow groove at a first end 77, that expands to a deeper rounded channel along a middle area 79 and tapers to a less deep rounded channel 81 closer to the inner wall 83 of the operating chamber head 26.

When the operating flange 129 is in the set to fire position shown in FIG. 5A, there is none or very little air leakage around the piston ring 43. When the trigger valve 65 is actuated by an electric pulse from the firing circuit 42, the flange 129 accelerates from left to right. A time break transducer 44 installed at a passage from the operating chamber 130 transmits a signal to the control circuit 42 that the air gun 10 has fired. As shown in FIG. 5B, arrows indicate air flow as the piston ring 43 of the flange 129 rides along the lands 73 of the inner surface of the liner sleeve 52 between the grooves 75. The lands 73 guide the piston ring 43 within the operating flange 129. By restricting air flow initially through the formation of the shallow narrow shape of the groove 75 at the first end 77, the rise time of the first primary pressure pulse may be slowed until the operating flange 129 reaches the widened channel in the middle 79 of the groove 75. The operating flange 129 then progressively accelerates until passing the widened and deepened middle section when flange 129 nears the end 81 where the slope and width of the grooves start to close off the air flow, the flange 129 is slowed by compressing the air within the operating chamber 130 to slow and stop the flange 129 prior to hitting the inner wall 83 of the operating chamber head 126. This is the point where the pressure peaks triggering the time break transducer which puts out the signal that the gun has fired. The speed of the operating flange 129 may therefore be controlled by the geometry of the grooves where the shape, width, length, slope and depth of the groove will all contribute to control of the rise time of the primary pressure pulse. By slowing the rise time, the time for the primary pressure pulse to reach peak pressure is increased which may reduce some high frequencies that are detrimental to marine life. Therefore, the appropriate groove geometry at the lower operating pressures of the air gun 10 may remove a source of spurious frequencies that may cause damage to the hearing of marine mammals and fish.

Figure 6:
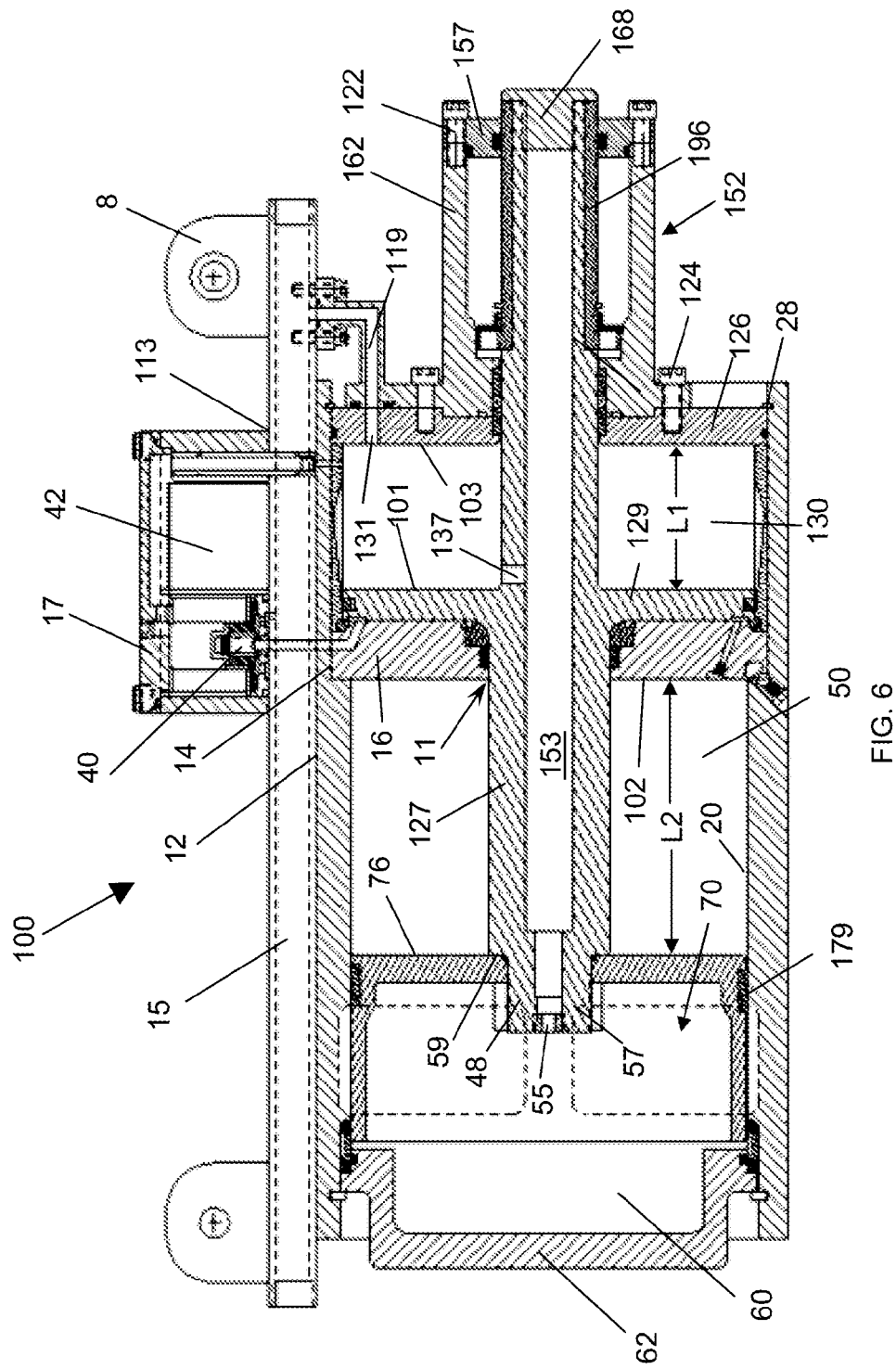
FIG. 6 is a longitudinal cross sectional view of a further embodiment of the air gun of the present invention.

In a further embodiment of the low pressure air gun 100, as shown in FIG. 6, the solenoid valve housing 17 may be affixed to the backbone 15 by vacuum oven brazing at mating surfaces 113 between the bottom of the housing 17 and backbone 15 thereby eliminating the necessity of using bolts to attach the solenoid valve housing 17. The operating chamber 130 is supplied with compressed air directly from the air supply line 119 through inlet 131 and the hollow interior bore 153 of the shaft 127 is supplied with air through inlet holes 137. The shuttle assembly shaft 127 extends through an opening in the operating chamber head 126. The air cushion chamber 50 may be of a length L2 that is at least 1.2 times longer in length along the axis of the shuttle assembly as measured in a set position from the inner face 76 of the firing piston 36 to the inner surface 102 of the bulkhead wall 16 than the length L1 within the operating chamber 30 along the axis of the shuttle assembly as measured in a set position from the inner face 101 of the operating flange 129 to the inner surface 103 of the operating chamber head 126. By increasing the length of the distance from the inner face 76 of the cup shaped firing piston 36 to the bulkhead wall 16, there is less buildup of air pressure within the air cushion chamber 50 when firing the air gun and therefore the speed and travel distance of the cup shaped firing piston 36 is less impeded. This provides for the discharge ports 70 to be opened more fully where the shuttle assembly is mostly slowed and stopped by the air cushion build up within the operating chamber 30. By opening the ports 70 more fully, the energy output from operating the air gun 10 at lower pressures may be comparable to high pressure air guns of the prior art. A fluid filled speed controller 152 is affixed to the operating chamber head 126 using bolts 124.

Figure 7A:
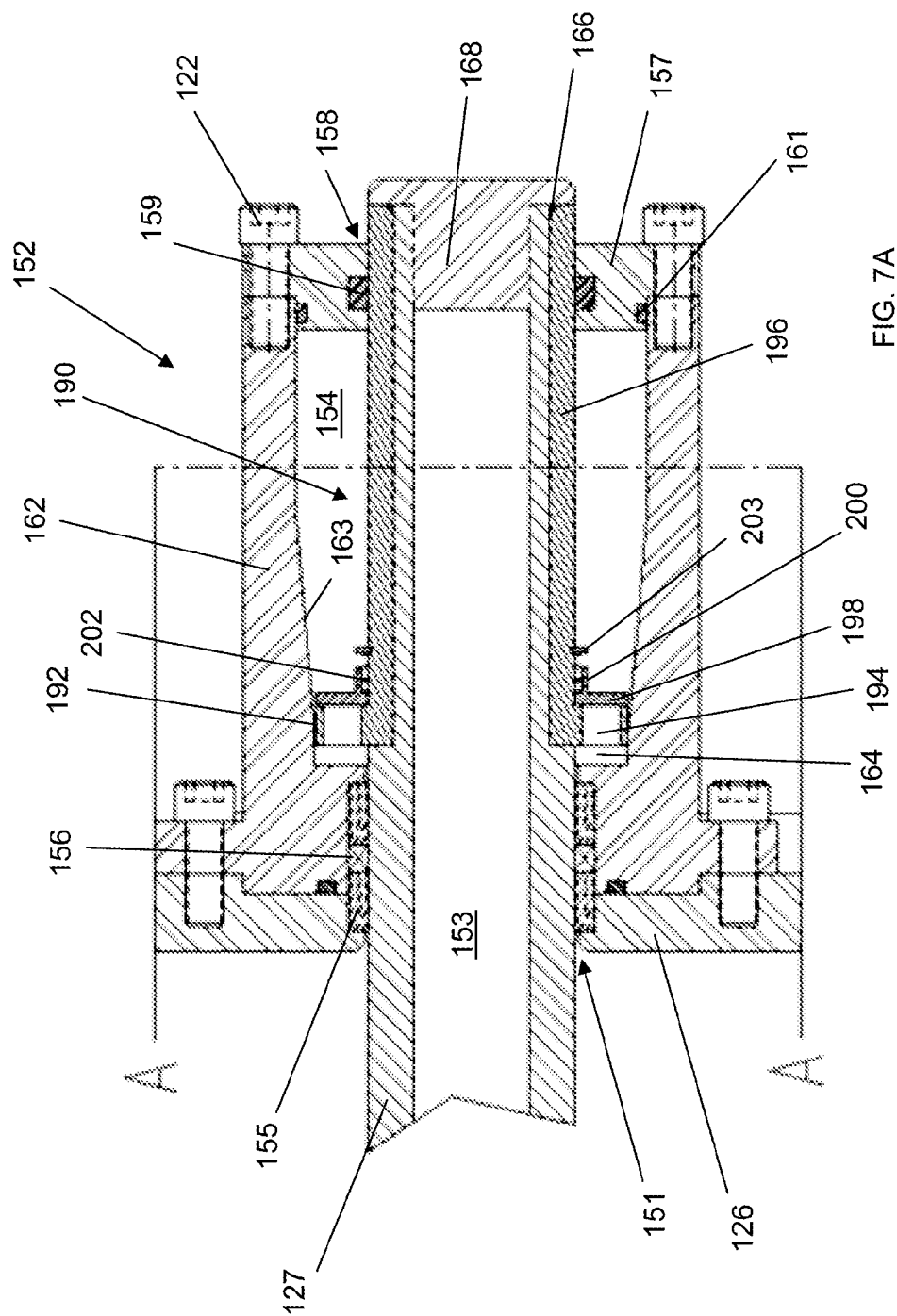
FIG. 7A is a longitudinal cross sectional view of an embodiment of a fluid filled speed controller in the further embodiment of the air gun of the present invention.
Figure 7B:
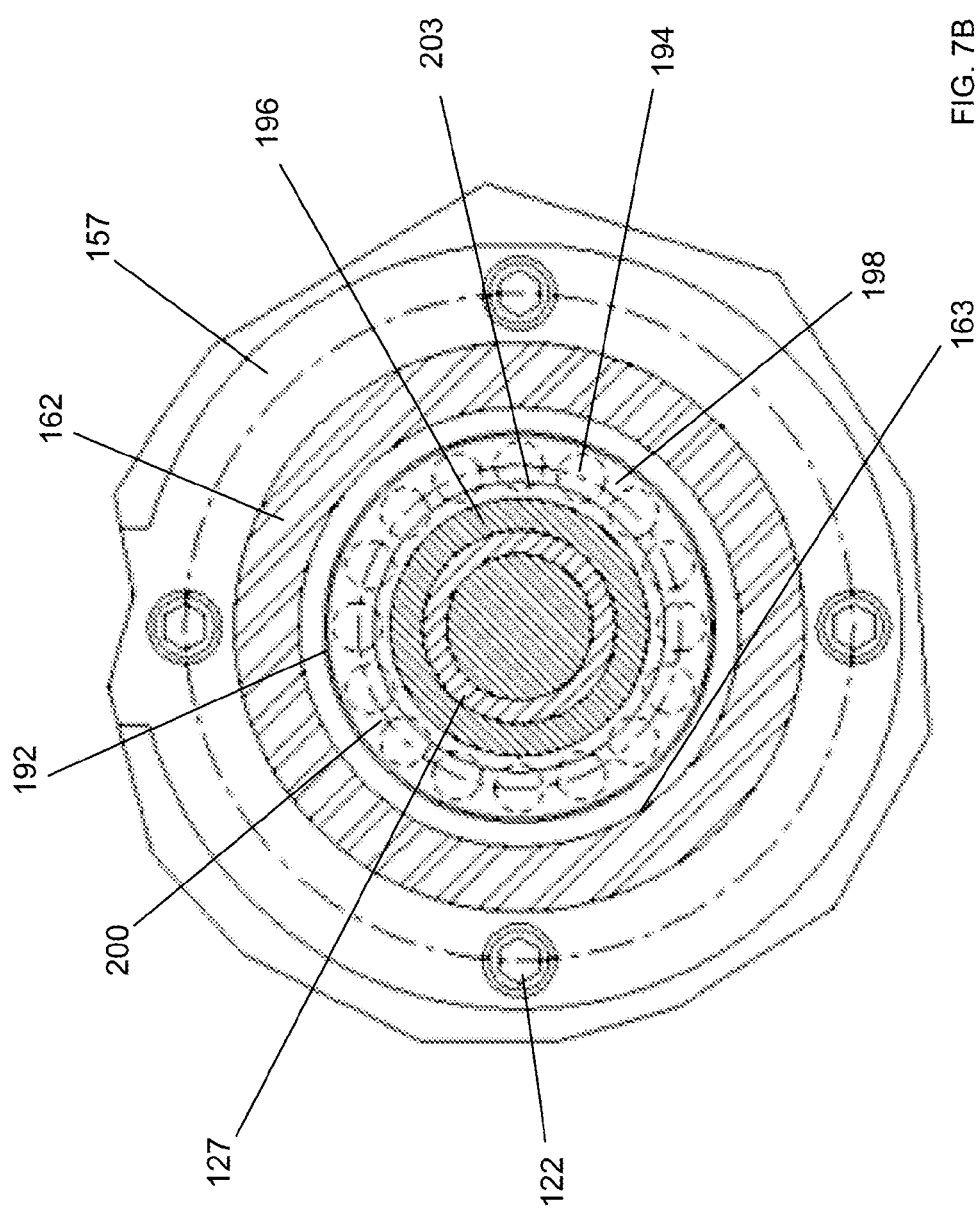
FIG. 7B is a cross sectional view along section A-A of FIG. 7A of an embodiment of a fluid filled speed controller in the further embodiment of the air gun of the present invention.
Figure 7D:
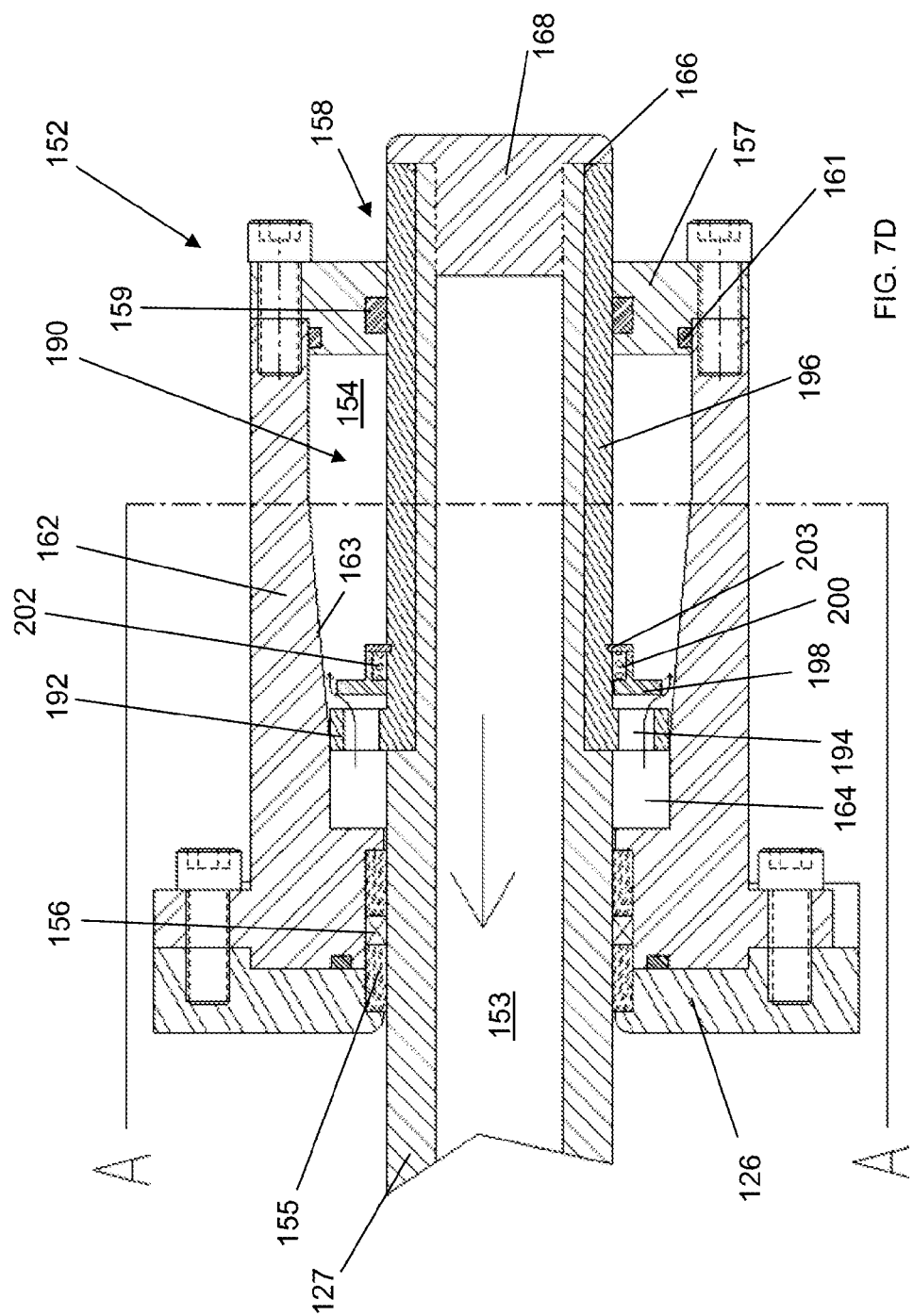
FIG. 7D is a longitudinal cross sectional view of an embodiment of a fluid filled speed controller in the set position in the further embodiment of the air gun of the present invention.

In this further embodiment which may be in addition to the operating chamber speed controller 52, a hydraulic speed controller 152 may be installed to an extended portion of the shuttle assembly shaft 127 of the air gun 100. The hydraulic speed controller 152 is bolted using bolts 122 to the outside center of the firing chamber head 126 of the air gun 100 to control the speed the shuttle assembly travels after the air gun 100 is triggered. The hydraulic speed controller 152 as shown in FIG. 7A includes an oil filled chamber 154 with the shaft assembly 127 of uniform diameter entering the opening 151 of the chamber 154 through two plastic bearings 155 with a shaft seal 156 retained between the two bearings 155. A check valve piston assembly 190 is installed to the shaft 127 and a speed controller housing head 157 is bolted to the top of the oil filled chamber 154 with an opening 158 for the end of the shaft 127 to extend through the head 157. An internal shaft seal 159 seals the outside diameter of the shaft 127 within the speed controller head 157 and an O-ring seal 161 seals the head 157 to the housing 162. A threaded retainer cap 168 is inserted into the hollow bore 153 to seal the shaft 127 and retain the check valve piston assembly 190 that surrounds the shuttle assembly shaft 127. The check valve piston assembly 190 includes a piston 192 with a ring of holes 194. The piston 192 is held in place within a bore 164 of the housing 162 by a tubular retainer 196 running through the speed controller housing head 157 and shaft seal 159. There is check valve plate 198 shaped like a circular washer biased against the check valve piston 192 by a spring 202 to cover the piston holes 194 causing the piston 192 with holes 194 and the spring biased ring plate 198 to become a check valve to remain closed when the shuttle assembly shaft 127 is accelerating upon triggering of the air gun 100. A spring retainer 200 retains the spring 202 and a ring plate 203 stops the spring biased ring plate 198 and sets the distance that the spring biased ring plate 198 moves when the check valve is opened. A cross sectional view of the speed controller 152 along section A-A of FIG. 7A is shown in FIG. 7B.

When the air gun shuttle assembly shaft 127 is in the set position before triggering the check valve piston assembly 190 is at the bottom of the speed controller housing 162 as shown in FIG. 7A where the clearance between the piston 192 and housing 162 is small. After triggering the shuttle assembly shaft 127 moves a short distance building pressure up in the housing 162 which acts against the top of the piston 192 and check valve plate 198 closing the holes 194 to retard and control the speed of the shuttle assembly as shown in FIG. 7C. The piston 192 starts to move with the shaft 127 over the outwardly tapered slope 163 of the housing bore 164 and as the shuttle assembly moves a greater distance the diameter around the piston 192 increases which allows the shuttle assembly to move faster until a terminal velocity is reached by the designed clearance between the piston 192 and housing 162. Thus the speed of the shuttle assembly can be controlled by the length of the bore and contour of the slope of the speed controller housing 162. After the shuttle assembly halts its movement after firing it reverses itself to return to the set position and during the return stroke the check valve plate 192 of the hydraulic piston assembly 190 opens to allow free hydraulic fluid such as oil to flow so that the shuttle assembly can return freely to its set position. By controlling the speed of the shuttle assembly shaft 127 through the geometry of the hydraulic speed controller bore 164 and slope 163 of the housing 162 the rate of rise of the outgoing sound pulse of the air gun may be adjusted to control the frequency content of the outgoing pulse in order to eliminate undesired high frequencies from the pulse.

Figure 8C:
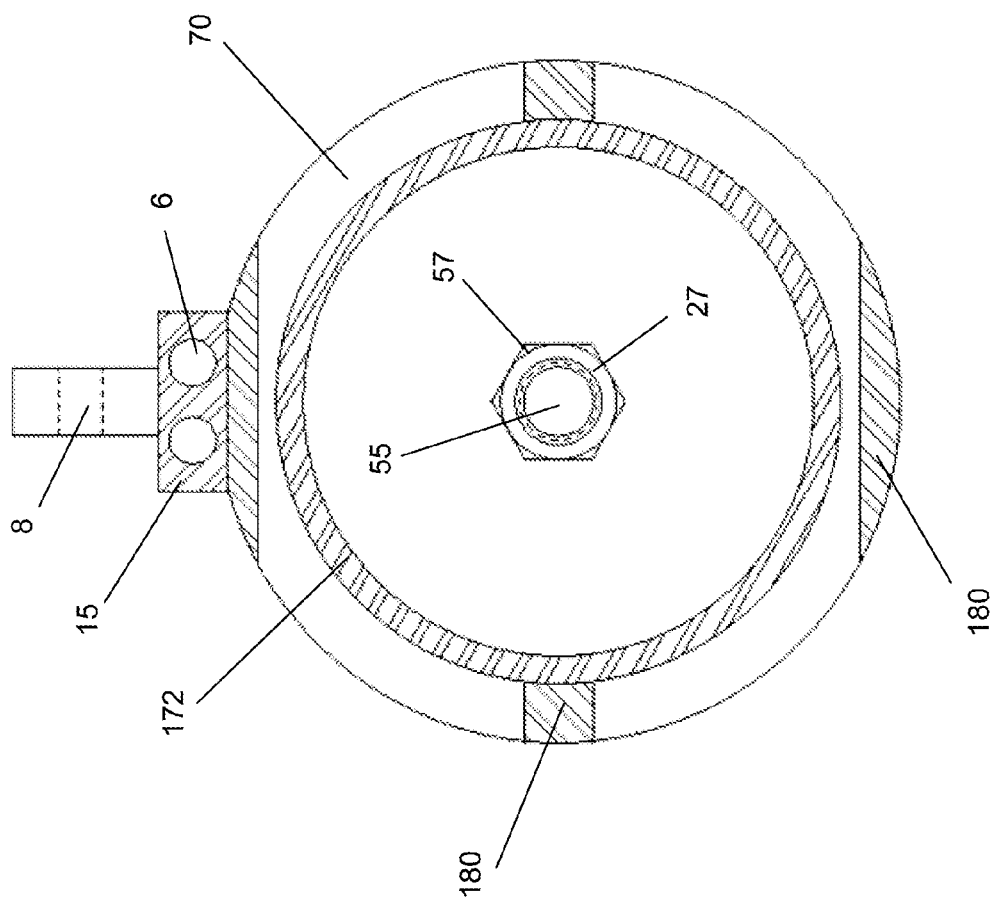
FIG. 8C is a cross sectional view along section A-A of FIG. 8A of an embodiment of the firing chamber and discharge ports of the air gun of the present invention.

As shown in FIG. 8A, due to the very rapid acceleration of the shuttle assembly of high pressure air guns, a very sharp sound output spike occurs when the end surface 172 of the opening cup shaped firing piston 36 clears the opening edge 165 of the exhaust ports 70. The rapid rise time of the resulting sound spike is so sharp, it may produce an abundance of high frequency sound in the surrounding water which is thought to be damaging to marine life such as fish and marine mammals. In order to reduce these spurious high frequencies in a low pressure air gun, a sliding firing seal 167 is installed on the outer diameter of the cup shaped shuttle assembly flange 36 to prevent the leakage of air prior to the end surface 172 of the cup 36 clearing the edge 165 of the port. The sliding firing seal 167, as shown in FIG. 8B is held securely between the contoured spring loaded back ring 169 and contoured shoulder 173 of the housing 18. A spring 171 is positioned within the spring loaded back ring 169 to provide the force to hold the firing seal 169 against the shoulder 173. In the set position the sliding firing seal 167 seals the outside diameter of the cup shaped firing piston 36 to retain the air within the firing chamber 62. A seal 177 seals the inside diameter of the spring loaded backup ring 169. The firing piston 36 rider bearing 179 is installed around the outer diameter of the upper portion of the cup shaped firing piston 36.

In an embodiment of the present invention, the width of the ports W extends beyond the outer diameter OD of the cup shaped firing piston 36 providing for as much air as possible to be expelled from the firing chamber with the shortest distance travel of the shuttle assembly shaft 27 improving the overall efficiency of the low pressure air sun 10. The ports 70 are formed as divider ports with strengthening horizontal posts 180 to give the air gun housing 18 rigidity between each of four ports shown in FIG. 8C in cross section of section A-A shown in FIG. 8A.

In operation at pressures lower than 1000 psi, the shuttle assembly shaft 27 accelerates when the air gun 10 is triggered and the bottom outside diameter surface 163 of the cup shaped firing piston 36 moves until it passes the sealing surface of the sliding firing seal 167. The spring loaded backup ring 169 maintains a force on the sliding firing seal 167 to prevent any leakage from around the outer diameter of the cup shaped firing piston 36. Therefore, while moving toward the edge of the ports 165 within the air gun housing 18 no compressed air is released from the compression chamber 30 during the acceleration distance. The reduction of air leakage and lower velocity of air as it accelerates out of the ports 70 at lower pressures reduces the content of high frequencies in the outgoing pulse and differently from conventional high pressure air guns, may reduce cavitations in the water that may disrupt the marine ecostructure and with the objectionable high frequencies may damage the hearing of marine mammals.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the low pressure air guns to particular applications, without departing from the scope of the following claims and equivalents of the claimed elements.

What is claimed is:

1. A low pressure air gun for seismic exploration which reduces high frequency sounds, comprising:

a cylindrical housing;
a bulkhead wall within the cylindrical housing to separate an operating chamber from an air cushion chamber;
a central opening in the bulkhead wall;
a shuttle assembly having a shaft inserted through the central opening in the bulkhead wall and having an operating flange on an end of the shaft within the operating chamber;
a cup shaped firing piston secured to an opposing end of the shuttle assembly shaft separating the air cushion chamber from the firing chamber;
a plurality of ports formed within the cylindrical housing, the width of the ports extending to a distance greater than the outer diameter of the cup shaped firing piston;
a firing chamber secured to the cylindrical housing; and
wherein the air gun operates at pressures in a range of 400 psi to 1000 psi.

2. The low pressure air gun for seismic exploration which reduces high frequency sounds of claim 1, wherein the air cushion chamber in a set position is of a length along the shuttle axis that is at least 1.2 times the length within the operating chamber along the shuttle axis as measured from the face of the operating flange to an operating chamber head.

3. The low pressure air gun for seismic exploration which reduces high frequency sounds of claim 2 further comprising snap rings to attach the firing chamber and the operating chamber head to the cylindrical housing.

4. The low pressure air gun for seismic exploration which reduces high frequency sounds of claim 1 further comprising a speed controller, the speed controller comprising:
   a fluted sleeve installed within the operating chamber;
   a piston ring installed to the outer diameter of the operating flange; and
   when triggered the operating flange moves the piston ring over the fluted sleeve to control the speed of the shuttle assembly.

5. The low pressure air gun for seismic exploration which reduces high frequency sounds of claim 4 wherein the speed controller controls the speed of the shuttle assembly to control the rise time from zero pressure to peak pressure of the primary pressure pulse.

6. The low pressure air gun for seismic exploration which reduces high frequency sounds of claim 4 wherein the speed controller fluted sleeve having grooves and the slope of the rise time of the primary pressure pulse is adjusted by modifying the geometry of one of at least the length, width, depth, slope and shape of the grooves.

7. The low pressure air gun for seismic exploration which reduces high frequency sounds of claim 1 further comprising a fluid filled speed controller.

8. The low pressure air gun for seismic exploration which reduces high frequency sounds of claim 1 further comprising a backbone vacuum brazed permanently in place on top of and to reinforce the cylindrical housing and serve as a flat mounting surface for solenoid operated air gun firing valve.

9. The low pressure air gun for seismic exploration which reduces high frequency sounds of claim 8 further comprising a trigger air passage directly through the backbone and the bulkhead wall to an annular space of the operating flange within the operating chamber said trigger air passage length less than the radius of the operating flange.

10. The low pressure air gun for seismic exploration which reduces high frequency sounds of claim 8 further comprising a solenoid valve housing detachable from the reinforcing backbone, the solenoid valve housing enclosing one of at least a solenoid operated air gun firing valve and a firing circuit.

11. The low pressure air gun for seismic exploration which reduces high frequency sounds of claim 8 further comprising a solenoid valve housing vacuum brazed to the reinforcing backbone, the solenoid valve housing enclosing one of at least a solenoid operated air gun firing valve and a firing circuit.

12. The low pressure air gun for seismic exploration which reduces high frequency sounds of claim 1 wherein the bulkhead wall is brazed in place to the cylindrical housing.

13. The low pressure air gun for seismic exploration which reduces high frequency sounds of claim 1 further comprising shaft seal rings and a retainer ring installed within the central opening in the bulkhead wall around the shuttle assembly shaft to seal the operating chamber from the air cushion chamber.

14. The low pressure air gun for seismic exploration which reduces high frequency sounds of claim 1 wherein the cup shaped firing piston having a sliding seal preventing air leaks between the cylindrical housing, firing chamber and air cushion chamber until the air gun is triggered and air is released through the plurality of ports.

15. The low pressure air gun for seismic exploration which reduces high frequency sounds of claim 1 wherein the plurality of ports having at least one horizontal post divider and the ports extending beyond the outer diameter of the cup shaped firing piston, said ports pointing outwardly opposite each other and horizontally away from the center line of the air gun.

* * * * *